Dec. 4, 1962 C. D. SOUTHARD 3,067,406

DIGIT EXTRACTION

Filed Oct. 2, 1958 5 Sheets-Sheet 1

INVENTOR
CARL D. SOUTHARD

BY Donald F Voss
ATTORNEY

Dec. 4, 1962 C. D. SOUTHARD 3,067,406

DIGIT EXTRACTION

Filed Oct. 2, 1958 5 Sheets-Sheet 2

DIGIT EXTRACTION

Filed Oct. 2, 1958 5 Sheets-Sheet 4

Dec. 4, 1962 C. D. SOUTHARD 3,067,406

DIGIT EXTRACTION

Filed Oct. 2, 1958 5 Sheets-Sheet 5

United States Patent Office 3,067,406

Patented Dec. 4, 1962

3,067,406
DIGIT EXTRACTION

Carl D. Southard, Endwell, N.Y., assignor to International Business Machines Corporation, New York, N.Y., a corporation of New York Filed Oct. 2, 1958, Ser. No. 764,915
13 Claims. (Cl. 340—172.5)

This invention relates to data sampling devices for digital computers and, more particularly, to data sampling and transferring devices for stored program digital computers which may be controlled by instruction words.

The instruction words or program steps for controlling the operation of a stored program digital computing machine may be stored in any suitable manner; such as in coded form upon the surface of a magnetic drum, in magnetic cores, in capacitor storage units and other storage devices. The coded instruction words can be interpreted by the computing machine to determine what its next operation should be. Hence, by storing original data and instruction words in the computing machine and having the facility of inserting additional data and instruction words during operation of the machine, then, by following a sequence of instruction words or a program routine which instruct the machine in the manner to operate upon or process the data words, the solution of a particular problem may be derived.

The instruction words which instruct the computing machine as to its next operation and the data words which the machine processes in accordance with the dictates of the instruction words are divided into several parts called digit positions and each digit position may comprise one or more smaller parts known as bits. The digit positions of a data word are capable of enabling the digital computer to make binary or yes-no type decisions. While bits have been combined in various ways at a digit position, each digit position of a data word for a stored program computer heretofore has only been able to facilitate one yes-no type of decision at any one time.

In this invention, each digit position of a data word is capable of containing more than one yes-no type of decision at any one time to thereby increase the capacity and utility of the computing machine. The present invention has great utility because, in many instances, the data word input to the computing machine is so great that insufficient storage facilities of the machine are available for the instruction words. However, since in the present invention each digit position of a data word is capable of facilitating more than one decision at any one time, adequate control is provided for processing the data words even though there is insufficient storage for instruction words.

By selectively interrogating or sampling the bit conditions in a selected digit position of a data word, the digit value represented by the bit conditions, or a partial digit value depending upon the sample value used for sampling, may be transferred to an element to permit analyzation to effect a yes-no type of decision. Since partial values of the value in a selected digit position of a data word may be sampled, each digit position can contain or facilitate several decisions.

Therefore, it is a prime object of this invention to provide means for enabling a single digit position of a data word of a stored program digital computer to contain, at any one time, more than one decision for further control of the computer.

Another object of this invention is to provide means for predetermined selective sampling of the value in a selected digit position of a data word in a stored program digital computer and, after sampling, depending upon the results to transfer a value corresponding to the digit value itself or a partial digit value or a zero value to permit analyzation thereof for further control of the computer.

Still another object of this invention is to provide means for immediately transferring the value or a partial value of a selected digit position in a storage element of a stored program computer to a corresponding digit position of another storage element.

Still another object of this invention is to provide an improved stored program digital computer which has an increased capacity for making decisions for further control of the computer without increasing the normal storage capacity.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is a data flow diagram for the digit sampling and data transfer system;

FIGS. 2*a* and 2*b*, with FIG. 2*b* disposed to the right of FIG. 2*a*, constitute a symbolic diagram of the circuits for the digit sampling and data transfer system;

GENERAL

For purposes of this invention, reference may be made to a stored program digital computer described in the application to F. E. Hamilton et al., Serial No. 544,520, filed November 2, 1955, now Patent 2,959,351, dated November 8, 1960, which contains a detailed description of apparatus and the operation thereof and definitions of terms used throughout this application.

Figure 3:
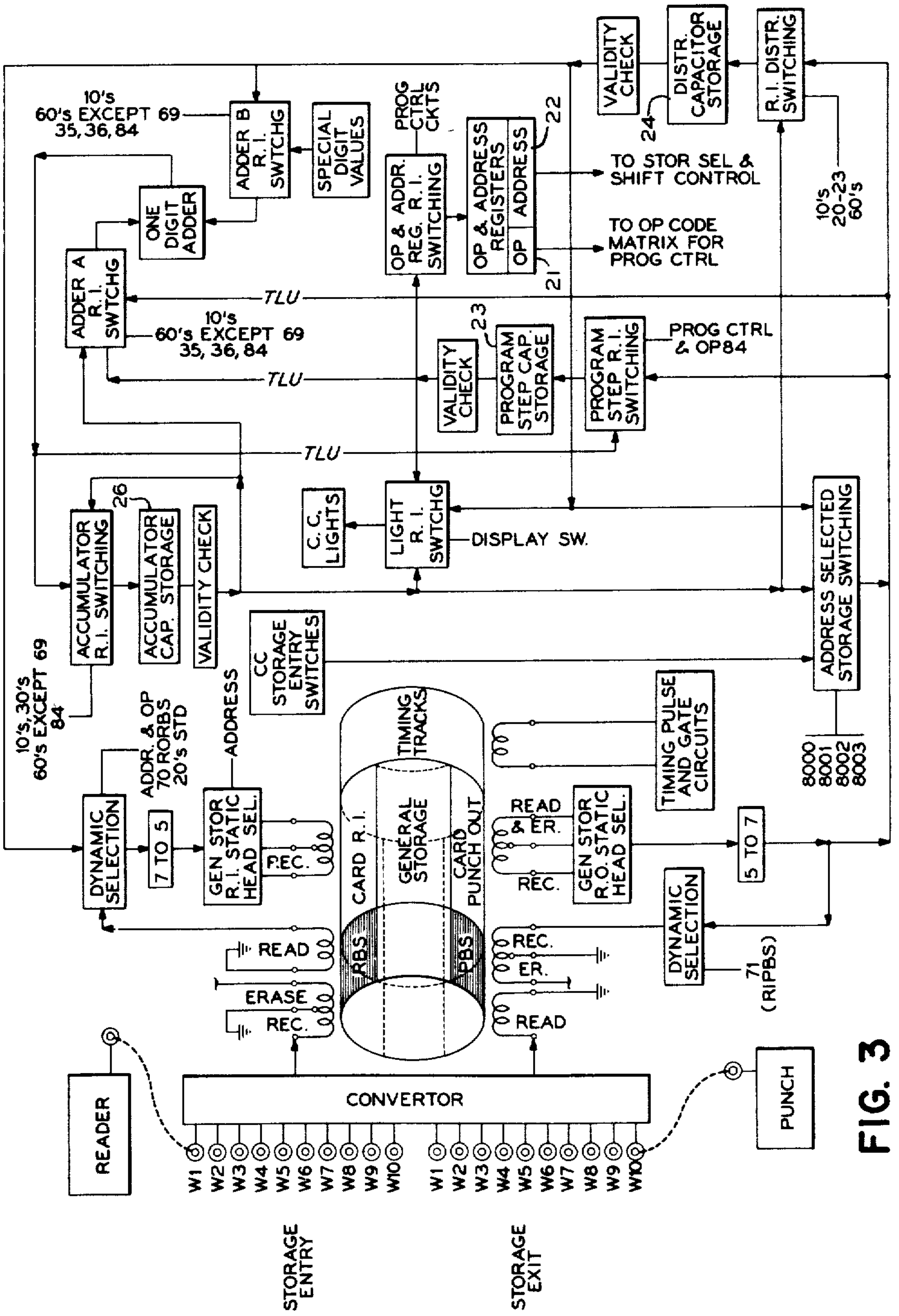
FIG. 3 is a general diagram of a stored program digital computer which may embody the digit sampling and data transfer system in accordance with the principles of the invention.

The general logical arrangement of the computing machine embodying the present invention is shown in FIG. 3, together with the principal functional units and various paths of information flow.

While the data flow paths in FIG. 3 are shown as a single line to simplify the illustration, each data flow path actually comprises seven parallel lines in accordance with the biquinary system. Information impulses representing the numerical value of each digit will be present on two of these seven lines during each digit interval. Also, the control lines shown singly may embody more than one such line.

Figure 6:
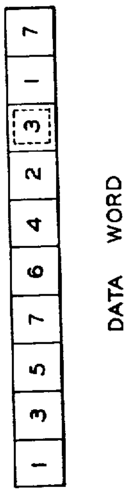
FIG. 6 is an illustration of a data word.
Figure 5:
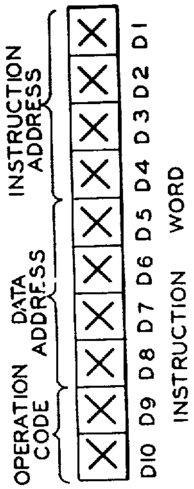
FIG. 5 is an illustration of an instruction word.

The meaning of any valid coded instruction word is built into the computing machine which interprets the values of the digit positions of the instruction word for its operation. Each program step or instruction word, as shown in FIG. 5, of a program routine is performed in two parts or half cycles. On the first part, the Instruction cycle or I-half cycle, the operation and address registers 21 and 22, respectively, FIG. 3, are reset and the I-address is placed in the address register 22 where it is interpreted and used to select the storage location specified by the I-address. The new instruction word is then read out of the storage location selected by the I-address and into the program step storage or register 23. On the second part of the program step, the Data cycle or D-half cycle, the operation and address registers 21 and 23, respectively, are reset and the operation and data parts of the new instruction word now in the program step register 23 are read out of the program step register 23 and into the operation and address registers 21 and 22, respectively. The D-address is interpreted and used to select the desired data word from the designated data storage location. The data word is then read out of the storage location designated by the D-address into the distributor 24. The operation code of the instruction word, as illustrated in FIG. 5, is interpreted and thereby activates the operation, which is performed using the data of a data word, as illustrated in FIG. 6, now in the distributor 24. This completes the particular program step.

As soon as the operation designated by the information in the operation register 21 is started to process the data word selected from data storage by the D-address, program control causes a return to the I-half cycle. The operation and address registers 21 and 22, respectively, are reset; and the I-address part of the instruction word in the program step register 23 is transferred to the address register 22 replacing the D-address, where it is interpreted and used to select the next I-address. The next instruction word is then read out of the storage location designated by the I-address in the address register 22 and read into the program step register 23 to replace the previous instruction word. The operation and address registers 21 and 22, respectively, are again reset and the operation and data parts of the new instruction word are read out of the program step register 23 and into the operation and address registers 21 and 22, respectively. At this point, an interlock prevents further program advance for arithmetical or logical operations until the previous program step has finished using or relieved the arithmetic units. In this manner, the machine advances through the steps of a stored program routine. The I and D half cycle action by which a program step is performed is accomplished by a program control commutator.

The main function of the program step storage or register 23 is to hold the instruction word that it receives from the I-address and supply the proper part of this word to the operation and address registers 21 and 22, respectively, for interpretation at the proper time. The distributor 24 acts as a buffer storage between the accumulating components and addressable storage locations. One of its main functions is to receive a word of data from the data storage location selected by the D-address and make this word available to the accumulating circuits as required by the operation designated by the operation code.

With the foregoing as general background information concerning data flow and program control in a stored program digital computer, the invention will now be described.

SAMPLING OPERATION AND DATA TRANSFER

Figure 1:
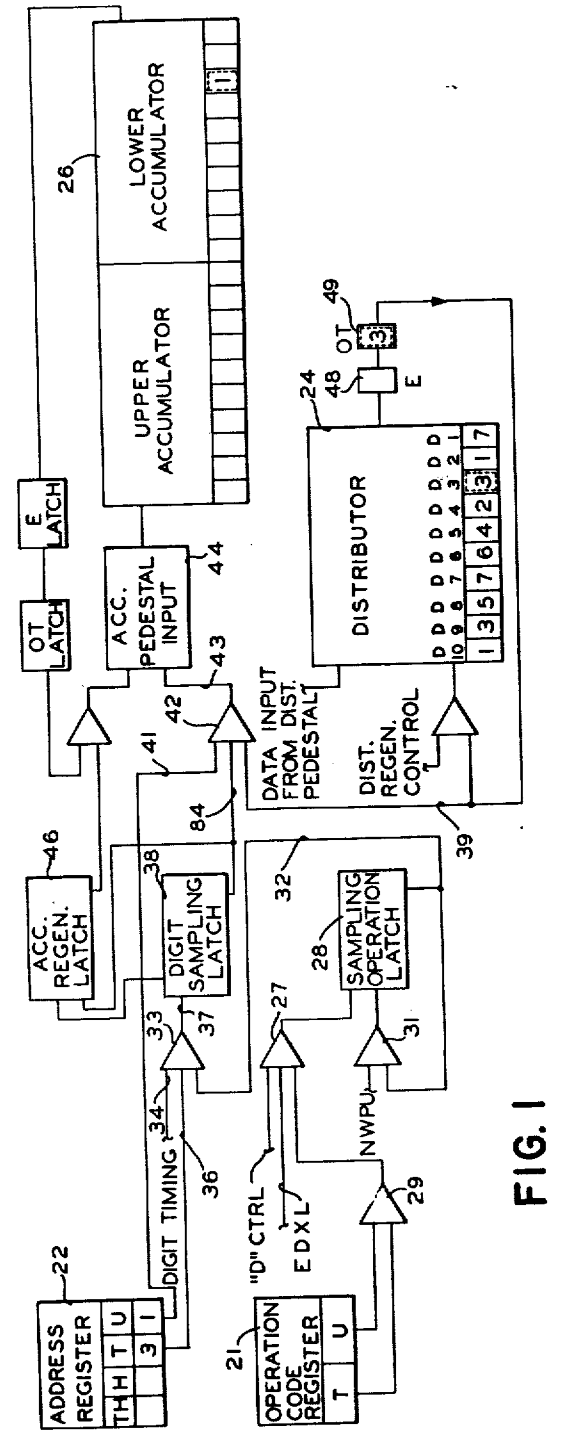
Figure 2A:
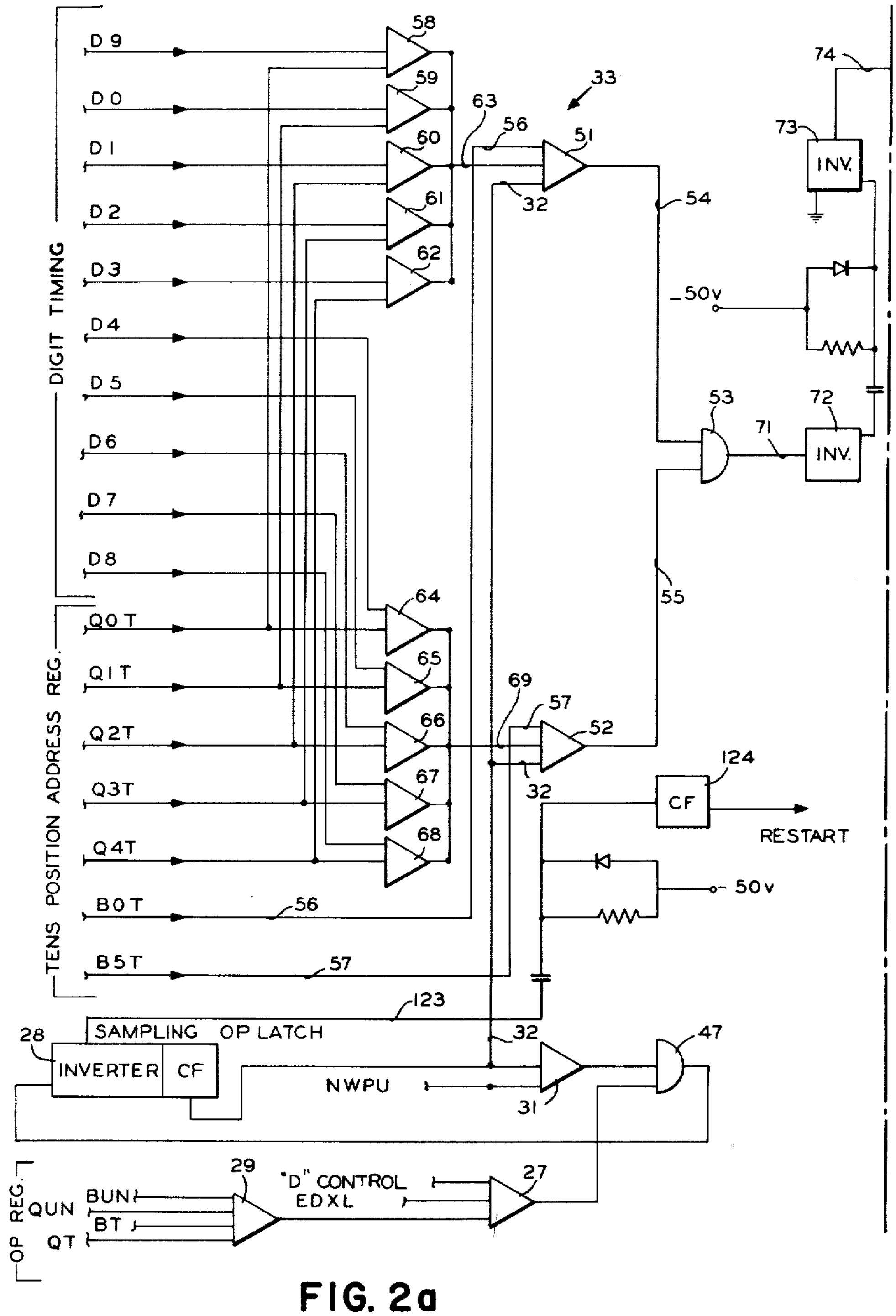
Figure 2B:
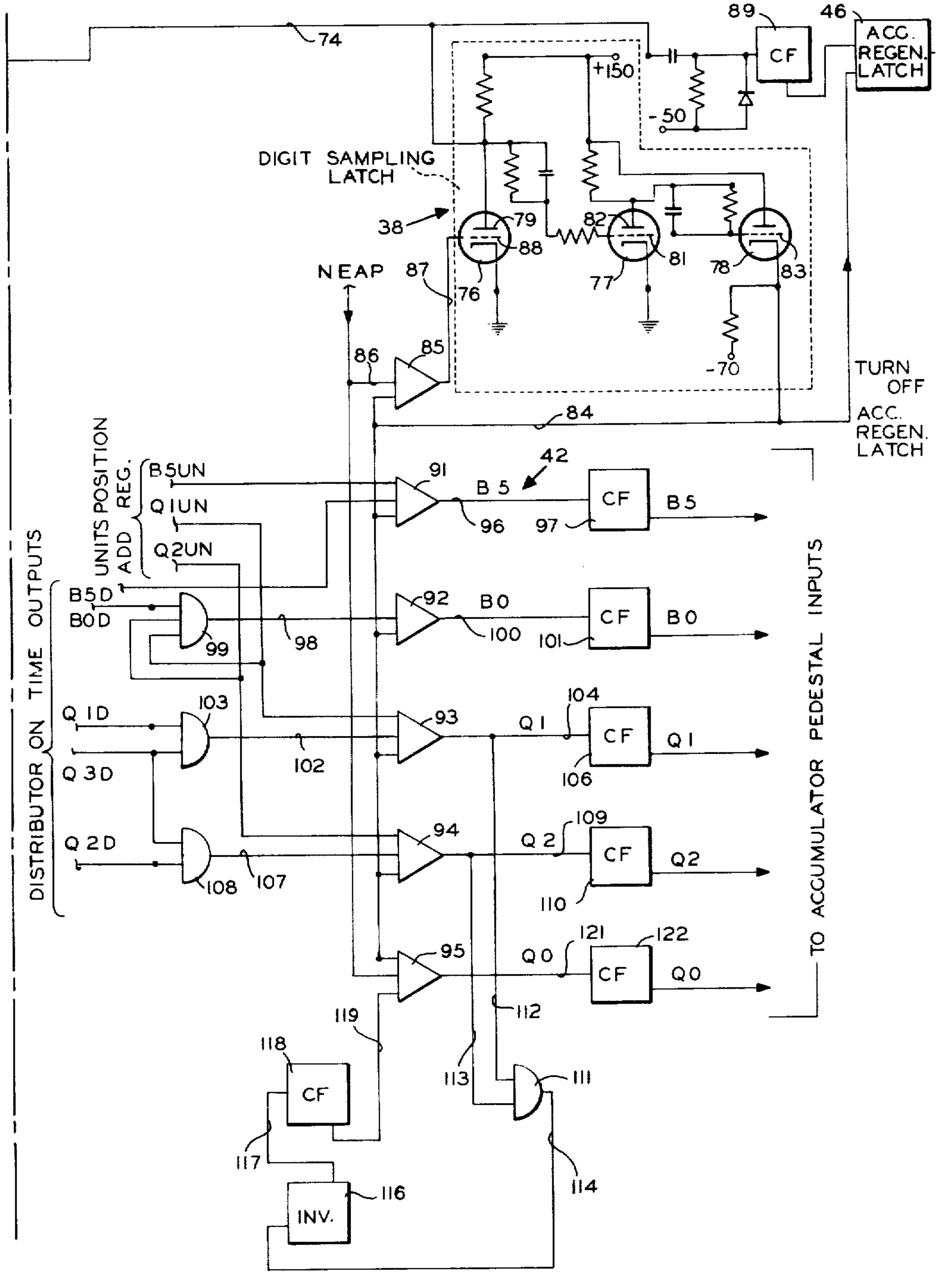

The circuitry for selectively sampling the value of a selected digit position of a data word in the distributor 24 and to transfer a value corresponding to either the sampled value or partial value thereof to a storage element for analyzation is shown generally in FIG. 1 and in detail in FIGS. 2*a* and 2*b*.

The invention is illustrated, by way of example, in FIG. 1 where the distributor 24 contains the data word with the digit positions to be selectively sampled. The value in the ten's position or order of the address register 22 selects the digit position of the data word in the distributor 24 to be sampled.

The value in the unit's position or order of the address register 22 selects the sample value used for sampling the value of the selected digit position to determine whether or not the sample value is contained therein in whole or part. If the sample value is contained in whole or part in the value of the selective digit position, a value corresponding to the sample value is transferred to a storage element for analyzation. When the sample value is contained either in whole or part in the value of the selected digit position and, therefore, is transferred to the storage element for analyzation, the results of the analyzation will instruct the computer to perform some particular operation. Whereas, if the sample value is not contained in whole or part in the value of the selected digit position, the value zero is transferred to the storage element for analyzation. In this instance, the results of the analyzation will instruct the computer to perform another sampling operation, but using a newly selected sample value. The particular manner in which this is done will be described shortly. But, before proceeding any further, the particular sample values which may be in the unit's position of the address register 22 should be considered.

As previously stated, a value corresponding to the value of the selected digit position or a partial value of the selected digit position may be transferred to a storage element for analyzation. Hence, the sample value predeterminedly inserted into the unit's position of the address register 22 can be utilized to determine by means of sampling whether or not the value of the selected digit position of the data word in the distributor 24 contains the sample value either in whole or part which, if contained, a value corresponding to the sample value will be entered into the storage element, the lower accumulator 26, for analyzation. If the sample value is not contained in whole or part in the value of the selected digit position, the value zero will be entered into the storage element, the accumulator 26, for analyzation.

To illustrate that the value of the selected digit position may also have partial values, the following table is constructed:

| Digit Value | Digit Combination | Digit Sum |
|---|---|---|
| 0 | 0 | 0 |
| 1 | 0+1 | 1 |
| 2 | 0+2 | 2 |
| 3 | 1+2 | 3 |
| 4 | 0 | 0 |
| 5 | 0+5 | 5 |
| 6 | 1+5 | 6 |
| 7 | 2+5 | 7 |
| 8 | 1+2+5 | 8 |
| 9 | 0 | 0 |

From this table it is seen that any digit value, 0–9, will contain either a 0, 1, 2, 5 or a combination thereof. Hence, a second table may be developed.

DIGIT VALUES

| Whole or Partial Digits | 0 | 1 | 2 | 3 | 4 | 5 | 6 | 7 | 8 | 9 |
|---|---|---|---|---|---|---|---|---|---|---|
| 0 | yes | yes | yes | yes | yes | yes | yes | yes | yes | yes. |
| 1 | no | yes | no | yes | no | no | yes | no | yes | no. |
| 2 | no | no | yes | yes | no | no | no | yes | yes | no. |
| 3 | no | no | no | yes | no | no | no | no | no | no. |
| 4 | no | no | no | no | yes | no | no | no | no | no. |
| 5 | no | no | no | no | no | yes | yes | yes | yes | no. |
| 6 | no | no | no | no | no | no | yes | no | no | no. |
| 7 | no | no | no | no | no | no | no | yes | no | no. |
| 8 | no | no | no | no | no | no | no | no | yes | no. |
| 9 | no | no | no | no | no | no | no | no | no | yes. |

From this latter table it is seen that the value of the selected digit position may be sampled by the predeterminedly selected sample value to determine whether or not the sample value is contained in whole or part in the digit value under consideration.

The value 1, either whole or in part, is contained in values 1, 3, 6 and 8 and not in values 0, 2, 4, 5, 7 or 9. The value 2, either whole or in part, is contained in values 2, 3, 7 and 8 and not in values 0, 1, 4, 5, 6 or 9.

The value 3 is contained wholly in the value 3 and not in values 0, 1, 2, 4, 5, 6, 7, 8 or 9.

The value 4 is contained wholly in the value 4 and not in values 0, 1, 2, 3, 5, 6, 7, 8 or 9.

The value 5, in whole or inpart, is contained in values 5, 6, 7 and 8 and not in values 0, 1, 2, 3, 4 or 9.

The value 6 is contained wholly in the value 6 and not in the values 0, 1, 2, 3, 4, 5, 7, 8 or 9.

The value 7 is contained wholly in the value 7 and not in the values 0, 1, 2, 3, 4, 5, 6, 8 or 9.

The value 8 is contained wholly in the value 8 and not in the values 0, 1, 2, 3, 4, 5, 6, 7 or 9.

The value 9 is contained wholly in the value 9 and not in the values 0, 1, 2, 3, 4, 5, 6, 7 or 8.

When sampling a selected digit position of the data word in the distributor 24 to determine whether or not the value therein, for example, contains a 1, either in whole or in part, or the sample value, if a 1 is wholly or partially contained in the value being sampled, a 1 is transferred into the lower accumulator 26 to occupy the digit position corresponding to the selected digit position or the sampled digit position of the distributor 24. If it is determined by means of sampling that a 1 or the sample value is not contained in the value of the selected digit position, either in whole or in part, then a 0 is entered into the lower accumulator 26 in the corresponding digit position.

With the understanding of the function of the value in the unit's position of the address register 22, the apparatus and arrangement thereof for selectively sampling or interrogating the value of a digit position of a data word in the distributor 24 to predeterminedly inquire whether or not the value in the unit's position of the address register 22 is contained in the value or a partial value thereof occupying the selected digit position of the distributor; and, if contained for transferring, a value corresponding to the value in the unit's position of the address register 22 to the lower accumulator 26 will be described.

A sampling operation latch 28, FIG. 1, controls the entire operation for selectively sampling the value of the selected digit position of a data word in the distributor 24. The sampling operation latch 28, and all other latches in this application, is of the type well known in the art and described in detail in the referenced application of Hamilton et al.

The sampling operation latch 28, FIG. 1, is controlled by a signal from the operation register 21, Data or "D" control signal, and Early Digit X Lower or EDXL signal through a switch 27. The signal from the operation register 21 results from the code designating a sampling operation which is interpreted by means of a switch 29. However, even though the operation register 21 designates that a sampling operation is to be performed, this operation is to take place only during the D-half cycle of the program step. Hence, by means of "D" control which is effected by the program control commutator described in the Hamilton et al. application, the sampling operation latch 28 will be turned "on" only during the D-half cycle.

Figure 4:
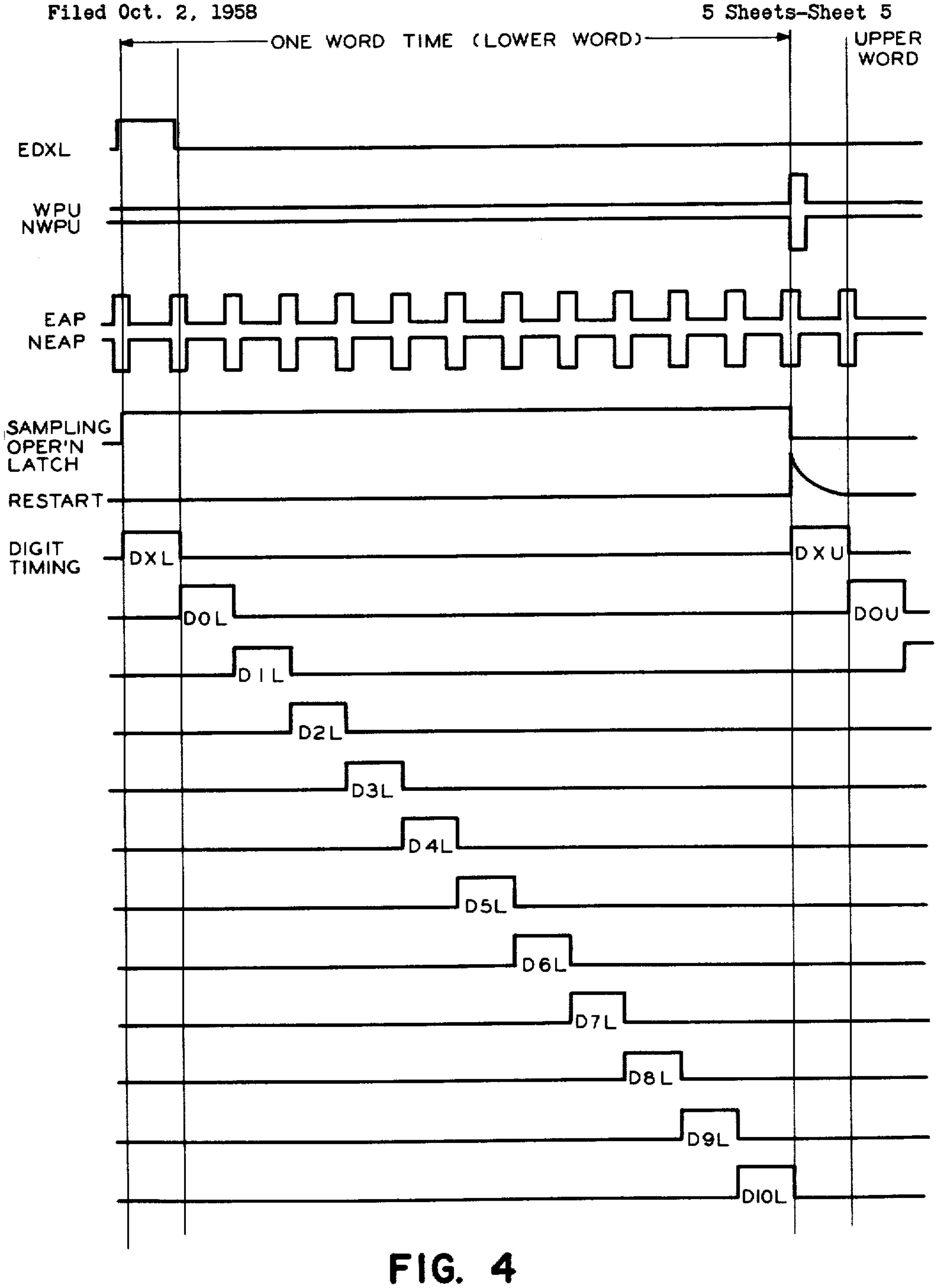
FIG. 4 is a timing diagram showing the various waveforms involved in the digit sampling and data transfer system.

Further, if the value in the unit's position of the address register 22 is contained in whole or part in the value of the selected digit position of the distributor 24, then a corresponding value is to be entered into the lower accumulator 26. Hence, the signal EDXL, as seen in FIG. 4, which is available only when data may be entered into the lower accumulator, permits the sampling operation latch 28 to be turned "on" only at the time data may be entered into the lower accumulator 26. In this manner, the sampling operation latch 28 will be turned "on" only when the operation code designates that a sampling operation is to be performed and only during the D-half cycle of the program step and only when data may be entered into the lower accumulator 26.

The output of the sampling operation latch 28, also utilized for latch back purposes, together with the signal Negative Word Pulse Upper or NWPU at switch 31, which will be described in detail hereinafter, is connected by a conductor 32 to a switch 33 having an additional connection 34 from digit timing for the computing machine and a connection 36 from the ten's position of the address register 22.

Digit timing, shown in FIG. 4, is described in detail in the referenced application of Hamilton et al. The switch 33, which actually comprises several switches and other elements as will be seen later herein, is connected by a conductor 37 to a digit sampling latch 38. Hence, when a signal is passed by the switch 33, the digit sampling latch 38 will be turned "on." Of course, the switch 33 can only pass a signal when the sampling operation latch 28 is "on" and there is a value in the ten's position of the address register 22 and there is a corresponding digit time with respect to the value in the ten's position of the address register 22. Hence, the value in the ten's position of the address register 22 selects the digit position of the data word in the distributor 24 having the value which will predeterminedly be sampled or tested by the value in the unit's position of the address register 22.

To accomplish sampling of the value of the so selected digit position of the data word in the distributor 24, that value and the value in the unit's position of the address register 22 are applied over conductors 39 and 41, respectively, to a switch 42 which is conditioned by the digit sampling latch 38. If the value in the unit's position of the address register 22 is contained either in whole or part in the value of the selected digit position, a value corresponding to the value in the unit's position of the address register 22 is entered into the lower accumulator 26 from the switch 42, over the conductor 43, and through the pedestal input 44 to occupy the digit position therein corresponding to the selected sampled digit position in the distributor 24. The reason that the value entered into the lower accumulator 26 occupies the digit position corresponding to the selected digit position of the distributor 24 is that the digit sampling latch 38 is turned "on" for the selected digit time only, and the output of this latch is connected to the switch 42 together with connections from the On Time outputs of the distributor 24 and the outputs representing the value of the unit's position of the address register 22.

Further, to permit entry of data into the lower accumulator 26, it is necessary that the accumulator regeneration latch 46 be turned "off." The turning "off" of the accumulator regeneration latch 46 is accomplished by means of a signal coming from the digit sampling latch 38 as it is turned "on." When the digit sampling latch 38 is turned "off," the accumulator regeneration latch 46 is turned "on" again to permit regeneration of the data in the lower accumulator 26 which would otherwise be lost due to its inability to store information indefinitely. In order for information to be retained in the distributor 24, it is also necessary to regenerate the data therein. The details concerning regeneration of information in the lower accumulator 26 and distributor 24 is not essential to the understanding of the present invention; however, this information is contained in the referenced Hamilton et al. application.

The above sets forth a general description and manner of operation of the apparatus embodying the present invention including the underlying principles involved. A detailed description of the apparatus and its operation will now be given.

DETAILED DESCRIPTION

As indicated above, the sampling operation takes place during the D-half cycle of the machine which is instructed to perform a sampling operation during the I-half cycle. Therefore, the sampling operation latch 28, which controls the entire sampling operation, will be turned "on" for the D-half cycle only.

It is seen in FIG. 2*a* that the operation code for a digit sampling operation contained in the operation code register 21 is interpreted by means of the switch 29. With the operation code interpreted, the sampling operation latch 28 is turned "on" at the proper time by switching the interpreted operation code with "D" control and EDXL at switch 27. Hence, by "D" control, the sampling operation latch 28 will be "on" for the D-half cycle only and, by EDXL, the value corresponding to the value in the unit's position of the address register 22, if contained in whole or part in the value of the selected digit position of the distributor 24, will be permitted to be entered into the lower accumulator 26. In this manner, the sampling operation latch 28 is turned on at Digit X Lower or DXL time, FIG. 4, and through a latch back circuit at switch 31; and mix 47 remains "on" until Word Pulse Upper or WPU time or one full word time. Since the output of the sampling operation latch 28, together with Negative Word Pulse Upper or NWPU, is utilized to hold the latch "on," it remains "on" until Word Pulse Upper or WPU time.

The output of the sampling operation latch 28, shown in FIG. 1, is connected to switch 33 to condition the same. The switch is more complex than shown in FIG. 1; the showing being to illustrate control over the turning "on" and "off" of the digit sampling latch 38. To effect the proper control of the digit sampling latch 38, provision must be had to turn the same "on" only at the proper time, which is the time the value of the selected digit position of the distributor 24 has just transferred from the Early or E latch 48 to the On Time or OT latch 49, FIG. 1. In other words, the digit sampling latch 38 and the OT latch 49 are turned "on" simultaneously.

The switch 33 actually comprises two switches 51 and 52, FIG. 2*a*, each being connected to an OR circuit or mix 53 by conductors 54 and 55, respectively. The switches 51 and 52, in effect, serve to turn the digit sampling latch 38 "on" and "off." Of course, the switches 51 and 52 should be able to turn "on" the digit sampling latch 38 only when the sampling operation latch 28 is in the "on" condition. Hence, the switches 51 and 52 are connected by the conductor 32 to the output of the sampling operation latch 28 to be conditioned thereby.

Before considering the other inputs to the switches 51 and 52, it should be noted that the values in the address register 22 is in biquinary form. Hence, the possible values which may be in the ten's position of the address register 22 may be separated into two groups. One group is associated with the binary bit BO Ten's or BOT, and the other group with the binary bit B5 Ten's or B5T. Therefore, a connection 56 is made from BOT to the switch 51 and a connection 57 from B5T to the switch 52. Since the value in the ten's position of the address register 22 selects the digit position of the distributor 24 to be sampled or tested each of the quinary or the "QT" bits of the ten's position of the address register 22 is switched with a proper digit time signal. The digit time signals are shown in FIG. 4 and are generated or developed in a manner indicated in the referenced Hamilton et al. application. In order for a 3, for example, in the ten's position of the address register 22 to select the third digit position of the distributor 24 for sampling, the "QT" bit for the value 3 or QT3 would be switched with digit time D3. However, as will be seen shortly, there is a one digit delay between the switches 51 and 52 and the digit sampling latch 38, FIGS. 2*a* and 2*b*. Hence, each of the "QT" bits of the ten's position of the address register 22 are switched with a digit time, one digit early to that digit time which would correspond to the particular "QT" bit. In this manner, Q0T and D9 are connected to a switch 58, Q1T and D0 to a switch 59, Q2T and D1 to a switch 60, Q3T and D2 to a switch 61, and Q4T and D3 to a switch 62. The outputs of the switches 58, 59, 60, 61 and 62 are commonly connected by a conductor 63 to the switch 51 together with B0T and the output of the sampling operation latch 28. Switches 64, 65, 66, 67 and 68 have connections from Q5T and D4, from Q6T and D5, from Q7T and D6, from Q8T and D7, and from Q9T and D8, respectively. The outputs of the switches 64, 65, 66, 67 and 68 are commonly connected by a conductor 69 to the switch 52 together with B5T and the output of the sampling operation latch 28.

The outputs of the switches 51 and 52 are directed through the mix 53 over a conductor 71 to an inverter 72 to provide a capacitor coupled input to an inverter 73, FIG. 2*a*. The output of the inverter 73 is connected via conductor 74 to the digit sampling latch 38, FIG. 2*b*. The digit sampling latch 38 is of a well-known type comprising two inverters 76 and 77, respectively, and a cathode follower 78. The plate 79 of the inverter is capacitively coupled to the grid 81 of the inverter 77 having its plate 82 capacitively coupled to the grid 83 of the cathode follower 78. The output of the cathode follower 78 is connected by conductor 84 to a switch 85 together with a conductor 86 over which a control pulse will be applied; in this example, a Negative Early A Pulse or NEAP, shown in FIG. 4 and described in the Hamilton et al. application. The switch 85 is connected by conductor 87 to the grid 88 of the inverter 76. The inverter 77 is normally conducting, and the cathode follower 78 and inverter 76 are nonconducting. The digit sampling latch 38 will be turned "on" when a negative-going signal is applied to the plate 79 of the inverter 76. The positive signal passed by either of the switches 51 or 52, FIG. 2*a*, and through the mix 53 is inverted by the inverter 72. The inverted signal is capacitively coupled to the inverter 73. The output signal from the inverter 73 is positive going at the start of a digit time and negative going at the end of a digit time. The positive portion of the signal has no effect on the inverter 73 because it is already conducting. However, the negative-going portion of the signal which occurs at the end of the digit time will cause the latch 38 to turn "on" at the start of the next preceding digit time. The negative-going portion of the signal causes a voltage drop through the capacitor coupling at the grid 81 of the inverter 77, FIG. 2*b*. This causes inverter 77 to stop conducting and, consequently, causes a voltage rise in its plate circuit. The rise in voltage is applied to the grid 83 of the cathode follower 78 to cause it to conduct. The output of the cathode follower 78, which is a positive output, is passed by the switch 85 with the coincident application of NEAP to the grid 88 of the inverter 76 to hold the latch 38 "on" for one digit time or until the following Early A Pulse or EAP, FIG. 4. It is thus seen that the digit sampling latch 38 is "on" for one digit time only and at the digit time selected by the value in the ten's position of the address register 22 which is the time the value in the so selected digit position of the distributor 24 is available for sampling.

In order to enter a value into the lower accumulator 26, it is necessary that the accumulator regeneration latch 46 be "off." Since a value is to be entered into the lower accumulator 26 during the digit time the digit sampling latch 38 is "on," the output of the digit sampling latch 38 is applied over the conductor 84 to turn "off" the accumulator regeneration latch 46, FIG. 2*b*. After the value is entered into the lower accumulator 26, it is to be retained therein, and this is accomplished by turning "on" the accumulator regeneration latch 46. To cause the accumulator regeneration latch 46 to turn back "on" after the digit sampling latch 38 turns "off," the plate of the inverter 76 is capacitively coupled to the grid of a cathode follower 89 having its output connected to turn "on" the accumulator regeneration latch 46. Hence, when the digit sampling latch 38 turns "off," there is a voltage rise at the plate 79 of the inverter 76. This voltage rise is capacitively coupled to the grid of the cathode follower 89 to cause the same to conduct. The conduction of the cathode follower 89 effects an output to turn "on" the accumulator regeneration latch 46.

To sample the value in the selected digit position of the distributor 24, the output of the digit sampling latch 38 is simultaneously applied over conductor 84 to condition the switch 42, FIG. 1, which actually comprises five switches 91, 92, 93, 94 and 95, respectively, FIG. 2*b*.

Only five switches are used in this example because the possible values in the unit's position of the address register 22 used for sampling are to be limited to the values 1, 2 or 5. It is believed that this will be sufficient for illustrating the invention. The respective biquinary values for the values 0, 1, 2 or 5 are B0 Q0, B0 Q1, B0 Q2 and B5 Q0. Hence, if the bit value of the selected digit position of the distributor 24 is being interrogated or tested by the bit value or sample value in the unit's position of the address register 22 to determine if the values 1 or 2 are contained either in whole or in part in the value of the selected digit position of the distributor 24, then whether or not there is the value 1 or 2 either in whole or in part in the value tested, an output bit B0 will be entered into the lower accumulator 26. Since if the value 1 is contained in the value of the selected digit position of the distributor 24, the bit value entered into the lower accumulator 26 would be B0 Q1; and, if the value 2 is contained therein, the bit value B0 Q2 is entered into the lower accumulator; and, if the value 1 or 2 is not contained therein, a zero is to be entered into the lower accumulator and the bit value of a zero is B0 Q0. Therefore, the bit B0 will be entered into the lower accumulator irregardless of the results of the test when the sample value or the value in the unit's position of the address register 22 is a 1 or a 2. Also, by a similar analogy, if the bits Q1 or Q2 are not to be entered into the lower accumulator 26, then provision may be made to automatically enter therein the bit Q0 since, if the bits Q1 or Q2 are absent, the values 1 or 2 are not to be entered into the lower accumulator 26; and, therefore, either a 0 or 5 will be entered therein and both the 0 and 5 contain the bit Q0.

In view of the foregoing reasoning, it is only necessary to use three of the seven available output bits from the unit's position of the address register 22 which will be B5UN, Q1UN and Q2UN and to use five of the seven available On Time output bits of the selected digit position of the distributor 24 which will be B0D, B5D, Q1D, Q2D and Q3D, FIG. 2*b*.

The switch 91 conditioned by the digit sampling latch 38 has an input connection B5UN from the unit's position of the address register 22 together with an input connection B5D from the On Time distributor outputs of the selected digit position. Accordingly, upon the simultaneous presence of the signal from the digit sampling latch 38, the signal B5UN from the unit's position of the address register 22 and the signal B5D of the distributor On Time outputs for the selected digit position, an output B5 is effected through the switch 91 and transmitted over a conductor 96 to a cathode follower 97 for shaping the output and from the cathode follower 97 to the pedestal input 44 of the lower accumulator 26.

The switch 92, in addition to the input from the digit sampling latch 38, has an input connection 98 from a mix 99 having input connections Q1UN and Q2UN from the unit's position of the address register 22 and an input connection B0D from the On Time distributor outputs of the selected digit position. Hence, either the presence of the bits Q1UN or Q2UN in the unit's position of the address register or the distributor On Time output B0D will be passed by the mix 99 to the switch 92 and, upon the simultaneous presence of the signal from the digit sampling latch 38, an output B0 is effected and transmitted over a conductor 100 to a cathode follower 101 for shaping the output B0 and from the cathode follower 101 to the pedestal input 44 of the lower accumulator 26. Hence, if the sample value in the unit's position of the address register 22 is a 1 or a 2, the bits Q1UN or Q2UN are present and, whether or not the bit value B0D is in the selected digit position of the distributor 24, the B0 output to the pedestal input 44 of the lower accumulator 26 will be effected. However, if the sample value is 5 or the value in the unit's position of the address register 22 is 5, the bits Q1UN and Q2UN are absent and there will not be an output B0 to the pedestal input 44 of the lower accumulator 26 unless there is the bit value B0D in the selected digit position of the distributor 24.

The switch 93 has an input connection Q1UN from the unit's position of the address register 22 together with an input connection 102 from a mix 103 and from the digit sampling latch 38. The mix 103 has input connections Q1D and Q3D of the On Time outputs of the selected digit position of the distributor 24. Hence, with the digit sampling latch 38 "on," if the bit Q1UN is in the unit's position of the address register 22, and either of the bits Q1D or Q3D of the On Time outputs of the selected digit position of the distributor are available, a bit Q1 output will be effected and transmitted from the switch 93 over a conductor 104 to a cathode follower 106 for shaping the output bit Q1 and from the cathode follower 106 to the pedestal input 44 of the lower accumulator 26. Since a 1 is contained in whole in a 1 and in part in a 3, 6 or 8, then, if there is a 1 in the unit's position of the address register 22 and a 1, 3, 6 or 8 in the selected digit position of the distributor 24, the value 1 or bits B0 and Q1 will be entered into the lower accumulator 26.

The switch 94 has an input connection Q2UN from the unit's position of the address register 22, an input connection 107 from a mix 108, and an input connection from the digit sampling latch 38.

The mix 108 has input connections Q2D and Q3D from the On Time outputs of the selected digit position of the distributor 24. Therefore, with the digit sampling latch 38 "on," if the unit's position of the address register 22 contains the bit value Q2UN, and either the bit Q2D or Q3D is contained in the selected digit position of the distributor 24, an output bit Q2 will be effected and transmitted over conductor 109 to a cathode follower 110 for shaping and from the cathode follower 110 to the pedestal input 44 of the lower accumulator 26. Since the value 2 is contained in whole or in part in a 2, 3, 7 or 8, therefore, with any of these values in the selected digit position of the distributor 24 when sampling or testing for a 2; i.e., a 2 in the unit's position of the address register 22, either of the bits Q2D or Q3D will be available and, of course, there will be the bit Q2UN. Hence, under these conditions and with the digit sampling latch 38 "on," there is an output bit Q2 to the pedestal input 44 and to the lower accumulator 26 together with the output bit B0 or, in other words, a 2 is entered into the lower accumulator 26.

Since there is to be a Q0 bit output when the sample value is 5, whether or not the value 5 is contained in whole or part in the value of the selected digit position of the distributor because both the values 5 and 0 contain the bit Q0, then the absence of the output bits Q1 or Q2 may be utilized to effect the output bit Q0. Another way of expressing this would be that, with the presence of either of the output bits Q1 or Q2, the output bit Q0 is not to be effected.

The output from the switches 93 and 94 is applied to a mix 111 over conductors 112 and 113, respectively. The output from the mix 111 is connected by a conductor 114 to an inverter 116 having its output applied over conductor 117 to a cathode follower 118 which is rendered conductive only upon receiving a positive-going signal. The output of the cathode follower 118 is applied over conductor 119 to the switch 95, also having input connections from the digit sampling latch 38 and from NEAP. The signal NEAP is merely applied for shaping of the output bit Q0 which is effected upon simultaneous application of signals to the switch 95 from NEAP, the digit sampling latch 38, and the cathode follower 118. The output bit Q0 is applied over conductor 121 through a cathode follower 122 for shaping purposes and from the cathode follower 122 to the pedestal input 44 of the lower accumulator 26.

If there is either an output bit Q1 or Q2 output to the mix 111, a positive signal will be applied to the inverter 116 to cause conduction thereof. Conduction of the inverter 116 will hold the cathode follower 118 out of conduction and, therefore, the necessary input signals to the switch 95 will not be satisfied to effect a Q0 bit output. However, in the absence of either of the output bits Q1 or Q2 to the mix 111, a negative signal will be applied to the inverter 116 which will render the same nonconductive. Nonconduction of the inverter 116 causes conduction of the cathode follower 118. With the cathode follower 118 conducting, the input requirements to the switch 95 are satisfied to effect the output bit Q0.

Since as the digit sampling latch 38 went "on" and the accumulator regeneration latch 46 was turned "off," it was possible to enter values into the lower accumulator 26.

When the digit sampling latch 38 is turned "off," the accumulator regeneration latch 46 is turned back "on." Therefore, the value entered into the lower accumulator 26 will be retained therein.

Upon the sampling operation latch 28, FIG. 2*a*, being turned "off" at Word Pulse Upper or WPU time, a signal is applied over conductor 123 to a cathode follower 124 to effect a restart signal which signals the machine for the next I-half cycle.

TYPICAL PROBLEM

*Program Step 1*

Load the distributor in the normal manner (by a standard instruction) with the data word containing the digit value to be sampled or interrogated.

Assume the distributor is loaded with the data word 1357642317, as shown in FIG. 6.

*Program Step 2*

Perform a sampling operation.

Assume this to be done in accordance with the word

| D10 | D9 | D8 | D7 | D6 | D5 | D4 | D3 | D2 | D1 |
|---|---|---|---|---|---|---|---|---|---|
| X | X | 0 | 0 | 3 | 1 | 1 | 8 | 3 | 6 |

where:

D1–D4 indicates that the location of the next instruction is 1836,

D5 indicates that a 1 is the sample value,

D6 indicates that digit position D3 of the data word in the distributor has been selected to be interrogated, and D9–D10 indicate that a sampling operation (operation code XX) is to be performed.

Program Step 2 would cause the following operation:

The operation code (XX) interpreted at switch 29, FIGS. 1 and 2*a*, is switched with "D" control and EDXL at switch 27 to turn "on" the sampling operation latch 28 through mix 47. The sampling operation latch 28 through the latch back circuit at switch 31, which switches the output of latch 28 with NWPU, remains on until WPU time or for one word time, lower word time only, as seen in FIG. 4.

With the sampling operation latch 28 "on," it conditions switches 51 and 52. The ten's position of the address register 22 (D6 of the instruction), according to the instruction word of this example, contains a 3 which in its biquinary form is B0T Q3T. Since the switch 51 has been conditioned by the sampling operation latch 28, B0T of the ten's position of the address register 22 will be switched with the output from switch 61 which switches Q3T of the ten's position of the address register 22 with digit D2 time. Since there is nothing on the B5T line of the ten's position of the address register 22, therefore, although the switch 52 has been conditioned by the sampling operation latch 28, the switch 52 will not pass Q3T of the ten's position of the address register 22 at digit D7 time.

The output of the switch 51 will be passed by the mix 53 through the inverter 72 to the inverter 73. However, the inverter 72 causes the signal to invert and, consequently at digit D2 time, the signal is negative going; and, as it arrives at the inverter 73, it is ineffective because the inverter 73 is not rendered conductive by a negative-going signal. The signal remains negative until digit D3 time and then goes positive to cause conduction of the inverter 73. Conduction of the inverter 73 through plate-pullover action turns "on" the digit sampling latch 38, FIGS. 1 and 2*b*. Hence, the digit sampling latch 38 goes "on" at digit D3 time and remains "on" for D3 time or until the following EAP, through the latch back circuit at switch 85, which switches the output of the latch 38 and NEAP.

As the digit sampling latch 38 turns "on," the accumulator regeneration latch 46 is turned "off" to permit data entry into the lower accumulator 26. Since the preceding is taking place during lower word (EDXL to EWPU) time, data will be entered into the lower accumulator 26.

With the digit sampling latch 38 "on" at digit D3 time, the switches 91, 92, 93, 94 and 95 are all condfitioned. Further, this means that the value of digit position D3 of the distributor 24 is selected to be interrogated. Hence, the value of D3 of the distributor 24 is being read out while the digit sampling latch 38 is "on." The value in D3 of the distributor 24, referring back to Program Step 1, is 3, or in biquinary form B0D Q3D. Therefore, the distributor On Time outputs of digit D3 time will be bits B0D Q3D. Now the value 3, as seen in the latter table above, contains a 1, 2 or 3; but the predetermined sample value is found in the unit's (D5 of the instruction word) position of the address register 22 to be 1. Hence, the bits B0UN and Q1UN are available from the unit's position of the address register 22; but, as previously explained, only the bit Q1UN is used.

Since the unit's position of the address register 22 contains a 1, there will be a B0 bit output from the switch 92 because Q1UN is passed by the mix 99 to switch 92 which is already conditioned by the digit sampling latch 38. The inputs to the switch 92 are an input from the digit sampling latch 38 which conditions the switch 92 and an input from the mix 99 having three inputs. A signal on any one of the inputs to the mix 99 will be passed thereby to the conditiond switch 92. Since, in this example, there is definitely a bit Q1UN from the unit's position of the address register 22 to the mix 99, the switch 92 will pass the bit Q1UN to effect a B0 output to the pedestal input 44 of the lower accumulator 26. The bit Q3D of the distributor On Time output of digit position D3 is passed by mixes 103 and 108 to switches 93 and 94, respectively. While both switches 93 and 94 have been conditioned at D3 time by the digit sampling latch 38, the bit Q3D of the distributor On Time outputs for digit D3 will not be passed by either of the switches 93 and 94 unless there is the bit Q1UN or Q2UN from the unit's position of the address register 22 to the switches 93 and 94, respectively. Since a 1 is in the unit's position of the address register 22, there is a bit Q1UN but not a bit Q2UN. Hence, the switch 93 will pass the bit Q1UN or effect a Q1 bit output to the pedestal input 44 of the lower accumulator 26, but nothing will be passed by switch 94 since the bit Q2UN is not present; and, therefore, there will not be any bit output Q2. Also, the Q1 bit output will be passed by the mix 111 to be inverted by the inverter 116 and transmitted as a negative-going signal to the cathode follower 118 which is unaffected thereby; and, hence, there is no signal to be passed by the conditioned switch 95 and the Q0 bit output is not effected. Further, since the bit B5UN is not present in the unit's position of the address register 22 since the sample value is 1, nothing will be passed by switch 91; and, therefore, there will not be a B5 bit output to the pedestal input 44 of the lower accumulator 26.

Accordingly, the only outputs to the lower accumulator 26 are the bits B0 and Q1 or 1. The value corresponding to the sample value enters the lower accumulator 26 in the same digit position occupied by the value of the selected digit position in the distributor 24 or, in this instance, it will be entered into the digit position D3 of the lower accumulator 26.

If the value of the selected digit position D3 of the distributor 24 were such that the sample value 1, either in whole or part, was not contained therein; for instance, if a 7 were in the digit position D3 of the distributor 24, the output bits B0, Q0 or the value 0 would be entered into the lower accumulator 26. Under the conditions just mentioned, the input bit Q1UN to the mix 99 would still be passed by the switch 92 to effect a B0 bit output. However, there will not be either a Q1 bit or a Q2 bit output. This is because the switch 93, which would pass a signal to effect a Q1 bit output, does not have an input signal from the mix 103, since there isn't either a Q1D or Q3D On Time output from the distributor 24. Also, the switch 94, which would pass a signal to effect a Q2 bit output, does not have a signal or the input bit Q2UN and, therefore, there isn't a Q2 bit output. Since there isn't either a Q1 bit or Q2 bit output effected, a negative-going signal is passed by the mix 111 and transmitted to the inverter 116 which inverts the signal to a positive-going signal. This positive-going signal causes the cathode follower 118 to conduct, and the switch 95 will pass the signal from the cathode follower 118 to effect a Q0 bit output. Since there is a B0 bit and Q0 bit output, a 0 will be entered into digit position D3 of the lower accumulator 26. Hence, it is seen that, when interrogating or sampling the value in the selected digit position of the distributor 24 for a particular value, the particular value must be contained in whole or in part or the value 0 will be entered into the lower accumulator 26.

Upon the digit sampling latch 38 going "off," there is a voltage rise at the plate 79 of the inverter 76. This rise in voltage is applied to the grid of the cathode follower 89 to render the same conductive. As the cathode follower 89 conducts, the accumulator regeneration latch 46 is turned "on" to permit regeneration of the value in the lower accumulator 26.

The sampling operation latch 28, FIG. 2*a*, turns "off" at WPU time to render the cathode follower 124 conductive and thereby effect a restart signal for signaling the computer to start on the next instruction or I cycle.

In the example just considered, a 1 was entered into the lower accumulator 26 at digit position D3 since the sample value 1 of the unit's position of the address register 22 had been contained in the value 3 of the selected digit position D3 of the distributor 24.

The next program steps in the operation could be as follows:

*Program Step 3*

Substract a 1 from the value in digit position D3 of the lower accumulator.

*Program Step 4*

Test accumulator for minus value.

Since, in this instance, a 1 subtracted from the value 1 in digit position D3 of the lower accumulator 26 would result in 0, there would not be a negative balance. Upon not finding a negative balance during the test therefor, the computer could be instructed to perform some problem. However, if there were a negative balance, as would be in the case of subtracting 1 from a 0 value in the lower accumulator 26, the computer could be instructed to do another sampling operation for sampling the same value of the selected digit position but the sample value would be changed; for example, to a 2.

By using the above-mentioned four program steps, it would be possible to selectively interrogate values in selected digit positions of the distributor as follows:

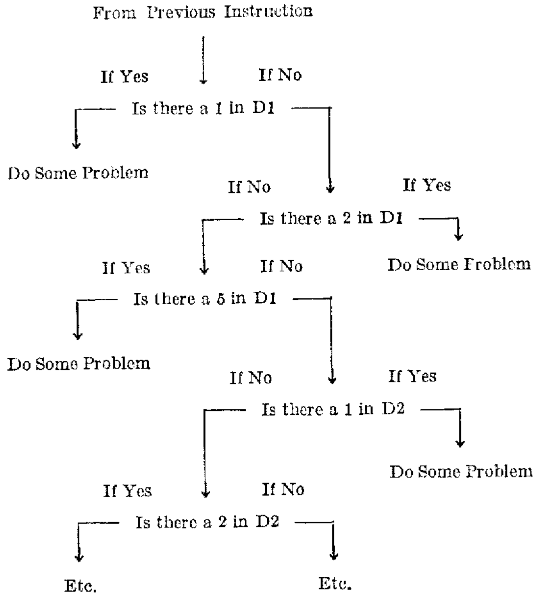

From the foregoing, it is seen that a single value of a digit position of a data word in a stored program digital computer can facilitate more than one decision for further control of the computer.

While the invention has been described as a data sampling and transfer device, it may also be thought of in terms of a digit extraction device. Since there is no modification or removal of data from the distributor, therefore, the invention cannot be properly termed as a digit extraction device. However, it may be thought, when considering the invention, that the value in the unit's position of the address register, otherwise known as the sample value, indicates the value to be extracted from the value of the selected digit position of the distributor. If this sample value is contained in the value of the selected digit position, in whole or part, then a corresponding value is extracted from the value of the selected digit position and entered into the lower accumulator; otherwise a zero is automatically entered therein. Hence, by properly defining the term "digit extraction," the invention could be referred to as such.

Further, from the foregoing, it is seen that this invention increases the capacity and utility of a stored program digital computer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a stored program computer for operating upon data comprising: a first storage device containing a plurality of digit positions arranged therein in definite order, each digit position having a certain value; a second storage device containing digit positions, at least one digit position of said second storage device for selecting one of said plurality of digit positions of said first storage device to facilitate sampling of the value therein, and at least another digit position of said second storage device for indicating the sample value to be used in sampling the value of the selected digit position; and means for determining whether or not the sample value is contained in whole or part in the value of said selected digit position, said means being connected to said one digit position of said second storage device and to said first storage device so as to be under control of said one digit position of said second storage device for comparing the value in the first storage device then made available to said means from said first storage device with the value in said another digit position of said second storage device.

2. In a stored program computer for operating upon data comprising: a first storage device containing a plurality of digit positions arranged in definite order therein, each digit position having a certain value; a second storage device having one digit position for selecting one of said plurality of digit positions of said first storage device to facilitate sampling of the value therein and another digit position for indicating the sample value to be used in sampling the value of the selected digit position; a third storage device having a plurality of digit positions arranged in order corresponding to the order of the digit positions of said first storage device; means for determining whether or not the sample value is contained in the value of the selected digit position of said first storage device, said means being connected to said one digit position of said second storage device and to said first storage device so as to be under control of said one digit position of said second storage device for comparing the value in the first storage device then made available to said means from said first storage device with the value in said another digit position of said second storage device; and means for entering into said third storage device in the digit position corresponding to the selected digit position of said first storage device the value corresponding to the sample value, if the same is contained, and the value zero, if the same is not contained in the value of the selected digit position.

3. In a stored program computer for operating upon data comprising: a first storage device containing a plurality of digit positions arranged in definite order therein, each digit position having a certain value; a second storage device having one digit position for selecting one of said plurality of digit positions of said first storage device to facilitate sampling of the value therein and another digit position for indicating the sample value to be used in sampling the value of the selected digit position; a third storage device having a plurality of digit positions arranged in order corresponding to the order of the digit positions of said first storage device; means for determining whether or not the sample value is contained in the value of the selected digit position of said first storage device, said means being connected to said one digit position of said second storage device and to said first storage device so as to be under control of said one digit position of said second storage device for comparing the value in the first storage device then made available to said means from said first storage device with the value in said another digit position of said second storage device; and means for entering into said third storage device in the digit position corresponding to the selected digit position of said first storage device the value corresponding to the sample value, if the same is contained or partially contained, and the value zero, if the same is not contained in the value of the selected digit position.

4. In a stored program computer for operating upon data comprising: a first storage device containing a plurality of digit positions arranged in definite order therein, each digit position having a certain value; a second storage device having one digit position for selecting one of said plurality of digit positions of said first storage device to facilitate sampling of the value therein and another digit position for indicating the sample value to be used in sampling the value in the selected digit position; a third storage device; means for determining whether or not the sample value is contained in the value of the selected digit position of said first storage device; and means for entering the sample value or zero into the third storage device if the sample value is or is not contained in the value in the selected digit position, respectively.

5. In a stored program computer comprising: a distributor having a plurality of digit positions, each digit position having a certain value; an address register having at least two digit positions, one digit position containing a value for selecting one of the digit positions of the distributor for a sampling operation and another digit position for containing the sample value; and means for determining whether or not the sample value is contained in the value of the selected digit position of the distributor.

6. In a stored program computer comprising: a distributor having a plurality of digit positions, each digit position having a certain value; an address register having at least two digit positions, one digit position containing the value for selecting one of the digit positions of the distributor for a sampling operation and another digit position for containing the sample value; comparing means for determining whether or not the sample value is contained in the value of the selected digit position of the distributor; and means operable under the control of said one digit position of said address register for selectively controlling said comparing means so that the sample value is compared with the value of the selected digit position of the distributor.

7. In a stored program computer comprising: a distributor having a plurality of digit positions, each digit position containing a certain value; an address register having at least two digit positions, one digit position for selecting one of the digit positions of the distributor for a sampling operation and another digit position for containing the sample value; an accumulator having a plurality of digit positions and capable of receiving values from the digit positions of the distributor; means for determining whether or not the sample value is contained in the value of the selected digit position of the distributor; and means for entering the sample value into the accumulator if the sample value is contained in whole or part in the value of the selected digit position.

8. In a stored program computer comprising: a distributor having a plurality of digit positions, each digit position containing predetermined values; an address register having a ten's and unit's position, the value of the ten's position for selecting one of the digit positions of the distributor for a sampling operation and the value of the unit's position for containing the sample value; an operation code register having digit positions containing values designating that a sampling operation is to be performed; a sampling means to determine whether or not the sample value is contained in the value in the selected digit position; means operable in response to values in the operation code register designating a sampling operation and in response to the value in the ten's position of the address register for gating the value of the selected digit position into the sampling means; and means for entering the value in the unit's position of the address register into the sampling means together with the entry of the value in the selected digit position to enable a sampling operation by said sampling means.

9. In a stored program computer, according to claim 8, further comprising: an accumulator having a plurality of digit positions and control means for entering the sample value into said accumulator if contained in whole or part in the value of the selected digit position of the distributor as determined by said sampling means.

10. In a stored program computer, according to claim 9, wherein said control means enters the sample value into the accumulator in a digit position corresponding to the selected digit position of the distributor when the sample value is contained in whole or part in the value of said selected digit position.

11. In a stored program computer, according to claim 10, wherein said control means enters a zero into the accumulator when the sample value is not contained in whole or part in the value of the selected digit position as determined by said sampling means.

12. In a stored program computer for operating upon data, a first data storage device having a plurality of digit positions arranged therein in a definite order, each digit position having bit lines capable of representing in coded form decimal values 0–9 whereby data flows therefrom over said bit lines digit position by digit position; a data storage control device having at least two positions wherein each position has bit lines capable of representing in coded form decimal values 0–9, the data in one of said two positions being continuously available on said bit lines while the data in the other position flows over the bit line associated with said other position to generate a control signal time related to the flow of data from said first data storage device and occurring according to the bit conditions of said another position; a controller operably connected to said other position of said two positions of said data storage control device to provide a gating signal; a switch connected to said controller to receive said gating signal and to certain bit lines of said first data storage device, said switch having an output consisting of a combination of bit lines formed from the bit lines coming from said data storage control device and said first data storage device; and a second data storage device having a plurality of digit positions arranged therein in an order corresponding to the digit positions of said first data storage device, said digit positions being connected to bit lines capable of representing in coded form decimal values 0–9, certain of said bit lines being connected to the output of said switch whereby the decimal value represented by the bit conditions existing on the output of said switch is entered into said second data storage device.

13. In a stored program computer for operating upon data, a first data storage device containing a plurality of digit positions arranged therein in a predetermined order, said digit positions being connected to bit lines capable of representing in coded form decimal values 0 through 9 whereby data flows therefrom over said bit lines digit position by digit position; a data storage control device having at least two positions wherein each position has bit lines capable of representing in coded form decimal values 0 through 9, the data in each position being continuously available on said bit lines; a first switch having input connections connected to the bit lines of one position of said two positions of said data storage control device and being adapted to be sequentially conditioned in timed relationship with the flow of data from said first data storage device digit position by digit position so as to pass a signal over its output when the bit conditions of said one position represent a decimal value which coincides with the decimal value of one digit position of the plurality of digit positions of said first data storage device; a controller operably connected to the output of said first switch to provide a gating signal of a predetermined time duration when there is a signal on the output of said first switch; a second switch having one input connected to said controller to be conditioned by said gating signal to pass signals over its outputs and having other inputs connected to certain bit lines of the other position of said two positions and to certain bit lines of said first data storage device, said outputs being bit lines to represent in coded form the decimal values 0, 1, 2 and 5 whereby bits appear on said bit lines when the bit conditions of said certain bit lines of said first data storage device coincide with the bit conditions of said certain bit lines of said other position; and a second data storage device containing a plurality of digit positions corresponding to the digit positions of said first data storage device, said digit positions being connected to bit lines capable of representing in coded form decimal values 0 through 9, certain of said bit lines being connected to said output lines of said second switch whereby the decimal value represented by the bit conditions of output lines is entered into said second data storage device in the digit position corresponding to said one digit position of said first data storage device.

References Cited in the file of this patent

UNITED STATES PATENTS

| | | |
|---|---|---|
| 2,737,342 | Nelson | Mar. 6, 1956 |
| 2,782,398 | West | Feb. 19, 1957 |
| 2,959,351 | Hamilton | Nov. 8, 1960 |

OTHER REFERENCES

Programming the IBM 650 Magnetic Drum and Data Processing Machine, by Andre.

Functional Description of the EDVAC, Report of the Ordnance Dept. of the Army and The University of Penn., Moore School of Electrical Engineering, Nov. 1, 1949, pages 2–28, 2–32, 2–33 and 2–38 to 3–1 of vol. 1 relied on and drawings 104–2LC–10, 104–2LC–9, 104–2LD–7 and 104–2LD–12 of vol. 2 relied on.